(12) United States Patent  (10) Patent No.: US 9,573,337 B2
Streitenberger et al.  (45) Date of Patent: Feb. 21, 2017

(54) DEEP-DRAWING PACKAGING MACHINE WITH LIFTING DEVICE

(71) Applicant: Multivac Sepp Haggenmüller GmbH & Co. KG, Wolfertschwenden (DE)

(72) Inventors: Andreas Streitenberger, Altusried (DE); Elmar Ehrmann, Bad Grönenbach (DE); Robert Maier, Babenhausen (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 264 days.

(21) Appl. No.: 14/183,695

(22) Filed: Feb. 19, 2014

(65) Prior Publication Data

US 2014/0230618 A1 Aug. 21, 2014

(30) Foreign Application Priority Data

Feb. 20, 2013 (EP) .................................... 13155942

(51) Int. Cl.
| | |
|---|---|
| *B31B 1/16* | (2006.01) |
| *B26D 5/14* | (2006.01) |
| *B29C 51/20* | (2006.01) |
| *B29C 51/38* | (2006.01) |
| *B26F 1/40* | (2006.01) |
| *B29C 65/00* | (2006.01) |
| *B29L 31/00* | (2006.01) |

(52) U.S. Cl.
CPC .................. *B31B 1/16* (2013.01); *B26D 5/14* (2013.01); *B26F 1/40* (2013.01); *B29C 51/20* (2013.01); *B29C 51/38* (2013.01); *B29C 66/53461* (2013.01); *B29C 66/8225* (2013.01); *B29C 66/8322* (2013.01); *B29L 2031/7162* (2013.01); *Y10T 83/04* (2015.04); *Y10T 83/9454* (2015.04)

(58) Field of Classification Search
None
See application file for complete search history.

(56) References Cited

U.S. PATENT DOCUMENTS

| | | | |
|---|---|---|---|
| 3,621,532 A | 11/1971 | Dahlberg | |
| 3,816,052 A | 6/1974 | Schoppee et al. | |
| 3,912,438 A * | 10/1975 | Padovani | B26F 1/40 425/292 |
| 4,112,042 A * | 9/1978 | Brocklehurst | B65D 43/0212 264/292 |
| 4,521,175 A * | 6/1985 | Medwed | B29C 51/04 425/387.1 |
| 2010/0269452 A1 | 10/2010 | Veix | |

FOREIGN PATENT DOCUMENTS

| | | |
|---|---|---|
| DE | 19734513 A1 | 2/1999 |
| DE | 102010060818 A1 | 6/2011 |
| DE | 102010019634 B3 | 11/2011 |
| JP | 2004331109 A | 11/2004 |
| WO | 2009141871 A1 | 11/2009 |

* cited by examiner

*Primary Examiner* — Monica Huson
(74) *Attorney, Agent, or Firm* — Husch Blackwell LLP

(57) ABSTRACT

The invention relates to a deep-drawing packaging machine and to a method of operating such a deep-drawing packaging machine, comprising a lifting device for a workstation, wherein a lower tool part connected to a stand and an upper tool part connected to a frame are coupled to each other and driven by a motor such that both tools may at least partially move together towards a film web.

5 Claims, 10 Drawing Sheets

DEEP-DRAWING PACKAGING MACHINE WITH LIFTING DEVICE

CROSS-REFERENCE TO RELATED APPLICATIONS

This Application claims priority to European Application Number 13155942.9 filed Feb. 20, 2013, to Andreas Streitenberger, Elmar Ehrmann and Robert Maier entitled "Deep-Drawing Packaging Machine with Lifting Device," currently pending, the entire disclosure of which is incorporated herein by reference.

FIELD OF THE INVENTION

The invention relates to a deep-drawing (viz. thermoforming) packaging machine and to a method of operating a deep-drawing packaging machine.

BACKGROUND OF THE INVENTION

DE 10 2010 019 634 A1 discloses a motor-driven lifting device for a cutting station of a deep-drawing packaging machine which moves a lower tool part or a cutting knife upwards towards a film web by means of a push rod driven by a motor. Here, an upper tool part or a counter knife is stationarily provided at the upper side of the film web. The production of packages containing products that project beyond the plane of the film web is not possible with this lifting device.

DE 197 34 513 A1 discloses a pneumatically driven lifting gear for a workstation of a deep-drawing packaging machine, wherein the upper tool part is coupled with the lower tool part via linkages in such a way that an upward motion of the lower tool part from the bottom to the film web is followed by a downward motion of the upper tool part from the top to the film web, the lifting motion of the lower tool part amounting to a multiple of the lifting motion of the upper tool part.

SUMMARY OF THE INVENTION

It is the object of one embodiment of the present invention to provide lifting gears in deep-drawing packaging machines with a top lift without using compressed air and complex linkages.

The deep-drawing packaging machine (viz. thermoforming packaging machine) according to one embodiment of the present invention comprises a lifting device for a workstation, the lifting device comprising a stand mounted to a machine frame and a lower tool part connected with a motor by means of a push rod. The packaging machine is characterized in that the lifting device can comprise a frame that is movable perpendicularly to a film web and relatively to the stand by means of a rotary element mounted on the axis of the motor and engaged with the frame. The lifting device may comprise an upper tool part connected to the frame, where the upper tool part and the lower tool part may at least temporarily be simultaneously moved towards the film web located between them. This has the advantage that a coupled movement of the lower tool part and the upper tool part towards the foil is permitted by means of only one motor. The lifting device may be designed such that the upper and lower tool parts perform different strokes.

The rotary element may be an eccentric, the eccentricity determining the stroke of the relative motion of the frame with respect to the stand and thus the stroke of the upper tool part.

The rotary element may be designed to cooperates with the frame in a guide to provide a restricted guide with only little clearance and the ability to absorb high forces.

In one embodiment, the rotary element is a lever with a guide pin, said guide pin cooperating with the frame in a guide which may be embodied as connecting link. The lever permits a large and adjustable eccentricity as the guide pin is able to assume different positions at the lever.

The connecting link can have a track guide for the guide pin, so that the upper tool part may temporarily not be moved during the movement of the lever relative to the film web, i.e., it may be kept stationary. The advantage resides in the fact that, for example, in a cutting station, the upper tool part may be designed as a counter knife and the lower tool part as a cutting knife, and a cutting knife which is not designed as a linear knife parallel to the film web presses the film web against the counter knife at first contact with the film web and during the further cutting operation. Since the counter knife does not perform any movement against the film web or away from the film web, no stress is exerted perpendicularly on the film web, and the formation of folds is prevented.

As an alternative, the guide comprises a track guide for the guide pin, so that the lower tool part may be temporarily not moved during the movement of the rotary element relative to the film web, i.e., it may be kept stationary. In case of a cutting station, this permits, for example, the use of a counter knife as the lower tool part and a cutting knife as the upper tool part.

The workstation may not only be a cutting station but also a sealing and/or forming station, each with an upper sealing or mould part and a lower sealing or mould part, respectively.

It may be suitable to provide a guiding facility between the stand and the frame. This permits to avoid tilting or a non-uniform movement of the frame along the guides in general. In other words, it is thus ensured that the tool part strikes the film web in an exactly defined orientation. For example, a mould or a cutting knife could remain oriented exactly parallel to the plane of the film web when the tool part strikes the film web.

The method according to one embodiment of the invention for the operation of a deep-drawing packaging machine with a lifting device for a workstation, wherein the lifting device comprises a stand mounted to a machine frame and a lower tool part connected to the motor by means of a push rod, is characterized in that the lifting device comprises a frame which is driven by the motor to perform a movement perpendicular to a film web and relative to the stand. The motor can move the lower tool part upwards to the film web, while an upper tool part, which is connected to the frame, is at least partially simultaneously moving downwards towards the film web. Thus, a coupled movement both of the upper tool part and the lower tool part towards the film web takes place with only one motor.

Particularly advantageously, the lower tool may be temporarily moved upwards to the film web by means of the motor as common drive, while the upper tool part temporarily stands still opposite to the film web, i.e., remains stationary.

The upper tool part may lie against the film web before the lower tool part reaches the film web, so that, for example in a cutting facility where the upper tool part may be designed as a counter knife, already at the first contact of the lower tool part, which is in this case designed as a cutting knife, with the film web, the counter knife functions as holding point and the formation of folds in the film web, and as a consequence an inaccurate cut, are thus excluded.

The workstation for which the method may be employed may be a forming station, a sealing station, and/or a cutting station.

It is also conceivable to equip in the deep-drawing packaging machine several, optionally different ones of these workstations with a lifting device in a manner according to the invention.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Similar components are always provided with the same reference numerals in the figures.

DETAILED DESCRIPTION OF THE INVENTION

Figure 1:
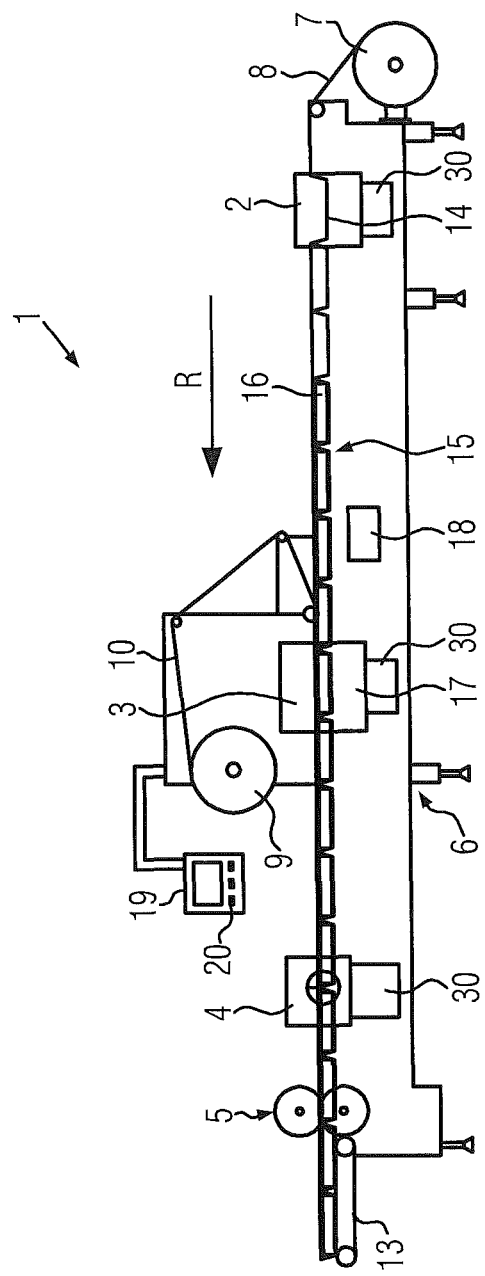
FIG. 1 is a schematic side view of a deep-drawing packaging machine in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a deep-drawing packaging machine 1 according to one embodiment of the present invention in a schematic view. As illustrated, this deep-drawing packaging machine 1 comprises a forming station 2, a sealing station 3, a transverse cutting unit 4 and a longitudinal cutting unit 5 which are disposed at a machine frame 6 in this sequence in a production direction R. At the entry side, a feed roller 7 may be located at the machine frame 6, from which roller a film web 8 is reeled off. In the region of the sealing station 3, a material storage 9 can be provided from which a lid film 10 is reeled off. At the exit side, a discharge apparatus 13 in the form of a conveying belt may be provided at the deep-drawing packaging machine by means of which finished, separated packages are carried away. Furthermore, the deep-drawing packaging machine 1 can comprise a non-depicted feeder which grips the film web 8 and transports it further in the production direction R in each main cycle. The feeder may be designed, for example, by clamp chains 60 disposed on either side (see FIG. 6).

In the shown embodiment, the forming station 2 is embodied as a deep-drawing station in which cavities 14 are formed into the film web 8 by deep-drawing. The forming station 2 may be designed such that several cavities are formed next to each other in the direction perpendicular to the production direction R. The forming station 2 can comprise a lifting device 30 to position a lower mould part to the top against an upper mould part in a working position for the forming process. In the production direction R downstream of the forming station 2, an insertion section 15 may be provided in which the cavities 14 formed in the film web 8 are filled with products 16.

The sealing station 3 can also have a lifting device 30 and a sealable chamber 17 in which the atmosphere in the cavities 14 may be replaced by a replacement gas or a gas mixture before sealing, for example by evacuation or gas flushing.

The transverse cutting unit 4 may also comprise a lifting device 30 and may be designed as a punching machine which cuts through the film web 8 and the lid film 10 between adjacent cavities 14 in a direction transverse to the production direction R. In the process, the transverse cutting unit 4 can operate such that the film web 8 is not cut through across its total width, but that it is at least not cut in an edge region. This permits a controlled further transport by the feeder.

In the shown embodiment, the longitudinal cutting unit 5 is embodied as a knife arrangement with several rotating revolving knives by which the film web 8 and the lid film 10 are cut through between adjacent cavities 14 and at the lateral edge of the film web 8, so that separated packages are present downstream of the longitudinal cutting unit 5.

The deep-drawing packaging machine 1 furthermore can comprise a control unit 18. The latter has the task of controlling and monitoring the processes running in the deep-drawing packaging machine 1. A display device 19 with operational controls 20 serves to visualize or influence the process operations in the packaging machine 1 for or by an operator.

The general operation of one embodiment of the packaging machine 1 will be briefly described below.

The film 8 is reeled off from the feed roller 7 and transported into the forming station 2 by the feed device. In the forming station 2, cavities 14 are formed in the film web 8 by deep-drawing. In a main cycle, the cavities 14 are transported further, together with the surrounding area of the film web 8, to the insertion section 15 where they are filled with products 16.

Subsequently, in the main cycle, the filled cavities 14 are transported further, together with the surrounding area of the film 8, to the sealing station 3 by the feed device. The lid film 10 is transported further with the feed motion of the film web 8 after a procedure of sealing it to the film 8. In the process, the lid film 10 is reeled off from the material storage 9. By sealing the lid film 10 onto the cavities 14, closed packages are formed which are separated in the subsequent cutting operations 4 and 5 and transported out of the deep-drawing packaging machine 1 by means of the discharge means 13.

Figure 2:
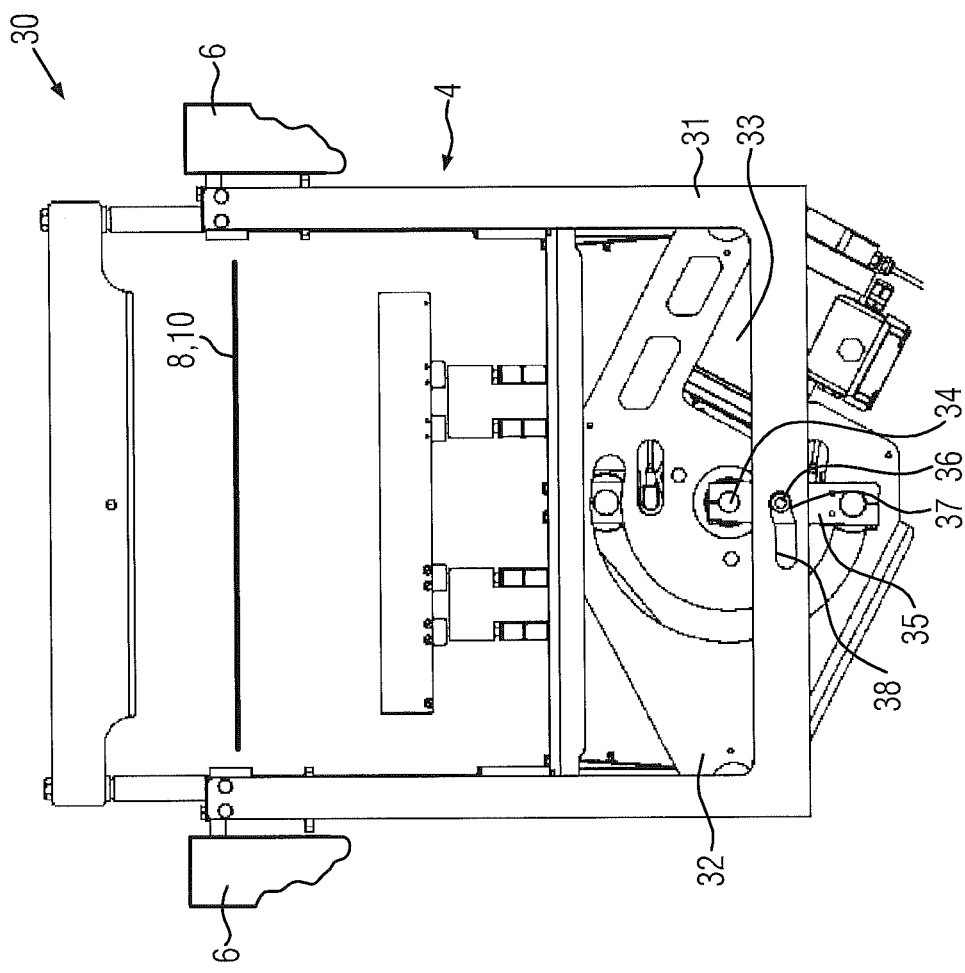
FIG. 2 is a side view in the production direction of a lifting device in accordance with a first embodiment of the present invention, the lifting device being used in connection with a transverse cutting unit and being shown in an opened position.

FIG. 2 shows the lifting device 30 at the transverse cutting unit 4 in an opened position as a view in the production direction R. The lifting device 30 can comprise a stand 31 which is mounted to the machine frame 6 and is thus suspended at it. A frame 32 may be moved vertically relatively to the stand 31 by means of guides which are not shown in greater detail. A motor 33, which may be a gear motor, can be mounted to the frame 32, its axis 34 being oriented in the production direction R. A rotary element 35 in the form of a lever may be attached to the axis 34, and a guide pin 36 provided at said rotary element 35 with a ball bearing 37 can be connected with a guide 38 embodied as connecting link in the stand 31 in such a manner that a rotation of the motor 33 results in a movement of the guide pin 36 in the guide 38 and thus in a relative movement of the frame 32 to the stand 31. The guide 38 does not extend linearly but rather has a contour that causes a rotation of the rotary element 35 to temporarily not result in a relative movement of the frame 32 with respect to the machine frame 6 and thus the film web 8, i.e., the frame 32 temporarily remains stationary relative to the stand 31 despite further rotation of the rotary element 35. Further details in this respect will be given below.

The lid film 10 is here already sealed to the film web 8 and is thus lying against the film web 8. Therefore, to simplify matters, reference is made below only to the film web 8.

Figure 3:
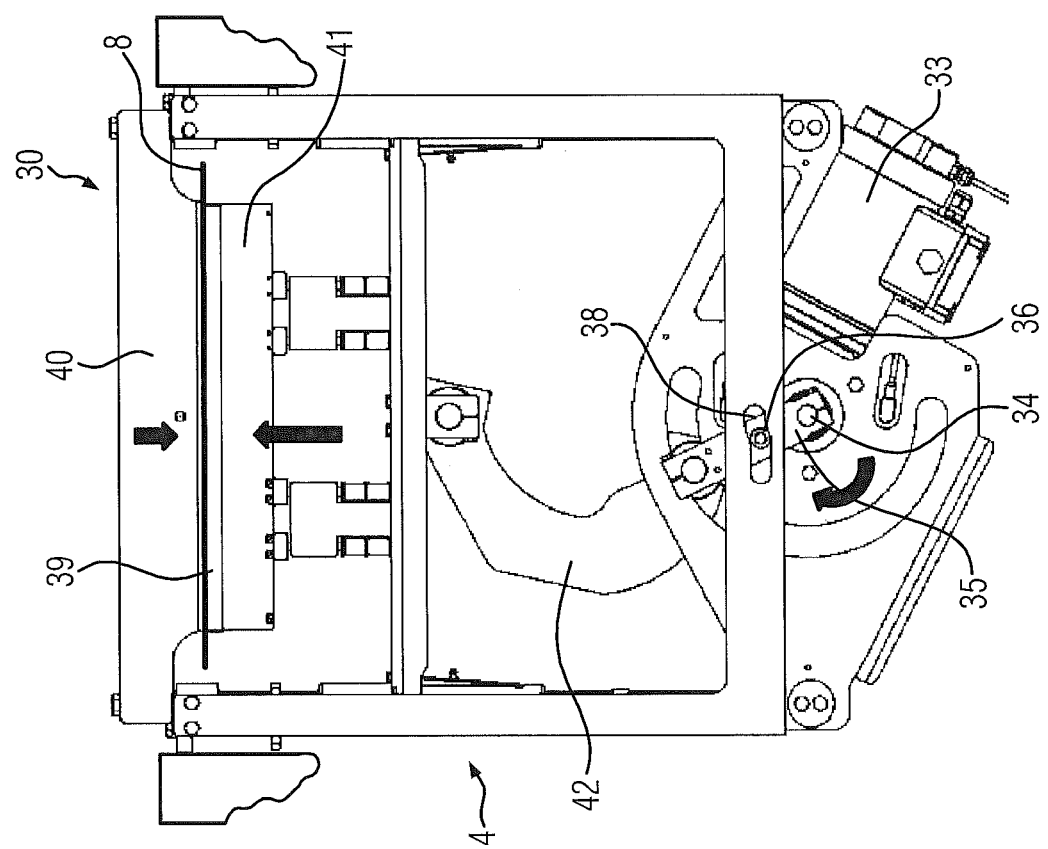
FIG. 3 is a side view of the lifting device of FIG. 2 at the beginning of a cutting operation.

Below, the motion sequence of the lifting device 30 will be illustrated more in detail with reference to FIGS. 3 and 4. FIG. 3 shows the lifting device 30 in a position in which a cutting knife 39, which may generally also be referred to as lower tool part, and a counter knife 40, which may generally also be referred to as upper tool part, are located at the film web 8. The cutting knife 39 may be changeably mounted on a support 41 and the support 41 can be lifted by the rotary motion (see bent arrow) of the motor 33 via the rotary element 35 and a push rod 42 in the direction of the film web 8 (see arrow). In this rotary motion of the motor 33, the counter knife 40 and/or the frame 32 move downwards (see arrow) relative to the stand 31 towards the film web 8.

Figure 4:
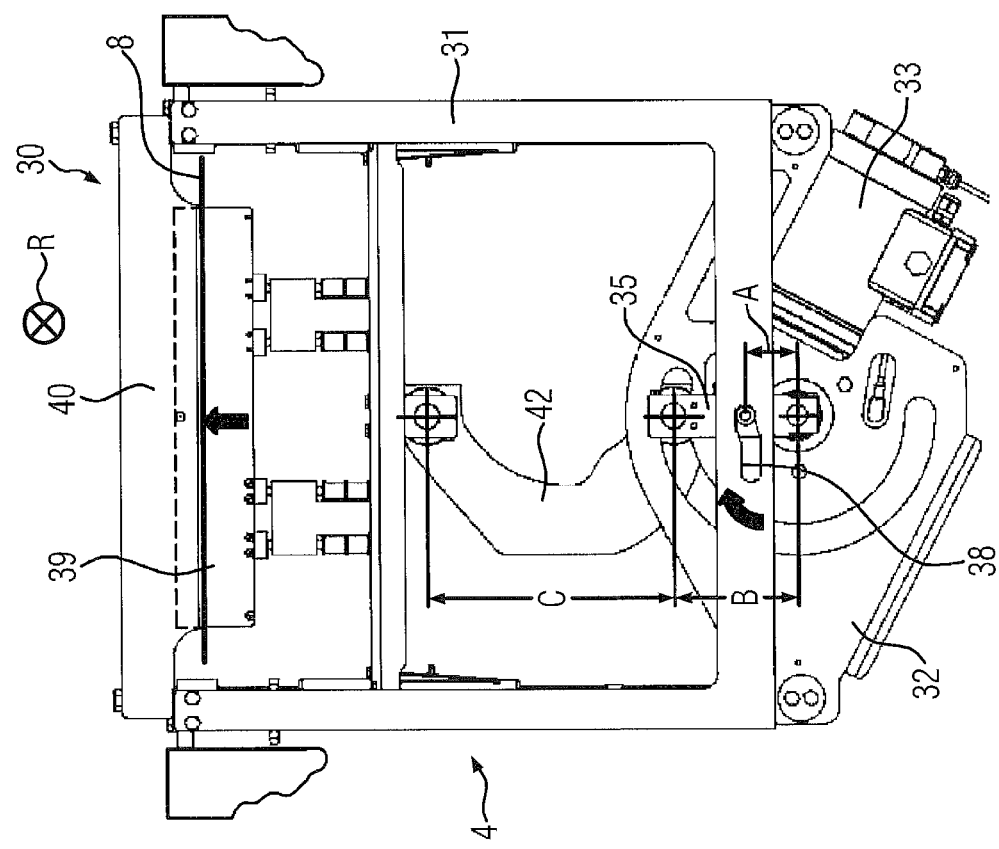
FIG. 4 is a side view of the lifting device of FIG. 2 in a closed position.
Figure 5:
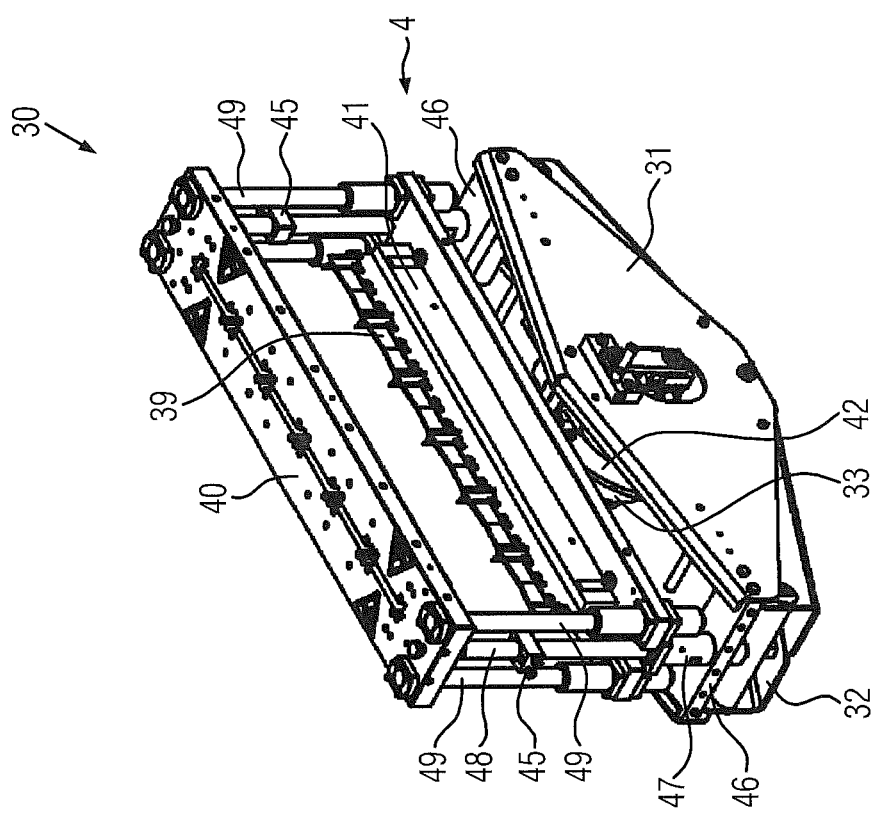
FIG. 5 is a side perspective view of a lifting device in accordance with a second embodiment of the present invention, the lifting device being used in connection with a transverse cutting unit and being shown in an opened position.

The contour of the guide 38 may have a course causing the counter knife 40 to rest against the film web 8 as of the position shown in FIG. 3, and causing the counter knife 40 to still rest against the film web 8 without moving relatively to it up to the position shown in FIG. 4, while the cutting knife 39 performs the further cutting operation. Concretely, the guide 38 may comprise a left first section and a right second section. The first section extends approximately horizontally. As long as the guide pin 36 of the rotary element 35 moves along said first section, this leads to a relative motion of the frame 32 relative to the stand 31. At the situation shown in FIG. 3, the guide pin 36 has just reached the transition from the first section to the second section of the guide 38. The course of the guide 38 in this second section corresponds to the radius of the guide pin 36 of the rotary element 35 about the axis 34. Thus, the frame 32 may maintain its position with respect to the stand 31 despite a further rotation of the rotary element 35, i.e., it may remain stationary relative to the stand 31. The motor 33 will rotate further, and the cutting knife 39 is moved further over the film web 8 or into the film web 8. The counter knife 40 can include a recess which is not shown in greater detail and allows the cutting knife 39 to dive into the counter knife 40 during the cutting operation.

FIG. 4 shows the closed or upper position of the lifting device 30. Here, the cutting knife 39 has cut through the film web 8 transversely to the production direction R as far as predetermined by the contour of the cutting knife 39. By the counter knife 40 lying flush against the film web 8 at the beginning and until the end of the cutting operation, no folds are formed and the film web 8 is not distorted, permitting an exact cut. Subsequently, the tools 39, 40 are moved apart again into their open initial positions according to FIG. 2 by a rotary motion of the motor 33 in the opposite direction. During this movement of the tools 39, 40, too, the film web 8 is pressed neither downwards nor upwards.

The height of the vertical lifting motion of the counter knife 40 is determined on the one hand by the distance A of the pin 36 to the axis 34 of the motor 33, which corresponds to an eccentricity, and on the other hand by the course of the guide 38. The height of the vertical lifting motion of the cutting knife 39 is determined on the one hand via the lever distances B and C of the rotary element 35 and the push rod 42, and on the other hand by the opposite relative motion of the frame 32 with respect to the stand 31.

In FIGS. 5 to 8, a first variant of the lifting device 30 for a transverse cutting unit 4 is shown. The primary difference to the embodiment as it is shown in FIGS. 2 to 4 relates to the performance of the relative motion of the frame 32 to the stand 31. The stand 31 is attached at either side of the machine frame 6, which is not shown in greater detail, indirectly via retainers 45 and directly via retainers 46. The frame 32 may be moved by means of a guide 47 vertically and with respect to the stand 31. As shown, the frame 32 is connected to the upper tool part 40 designed as a counter knife via the guide rod 48, and the upper tool part 40 is coupled to the frame 32 and its movement. The cutting knife 39 is disposed on the support 41, and the support 41 may be guided on either side on two guide pillars 49 each and may be moved vertically. The movement of the support 41 may be transmitted from the motor 33 to the support 41 by means of the rotary element 35, which is not visible here, and the push rod 42.

Figure 6:
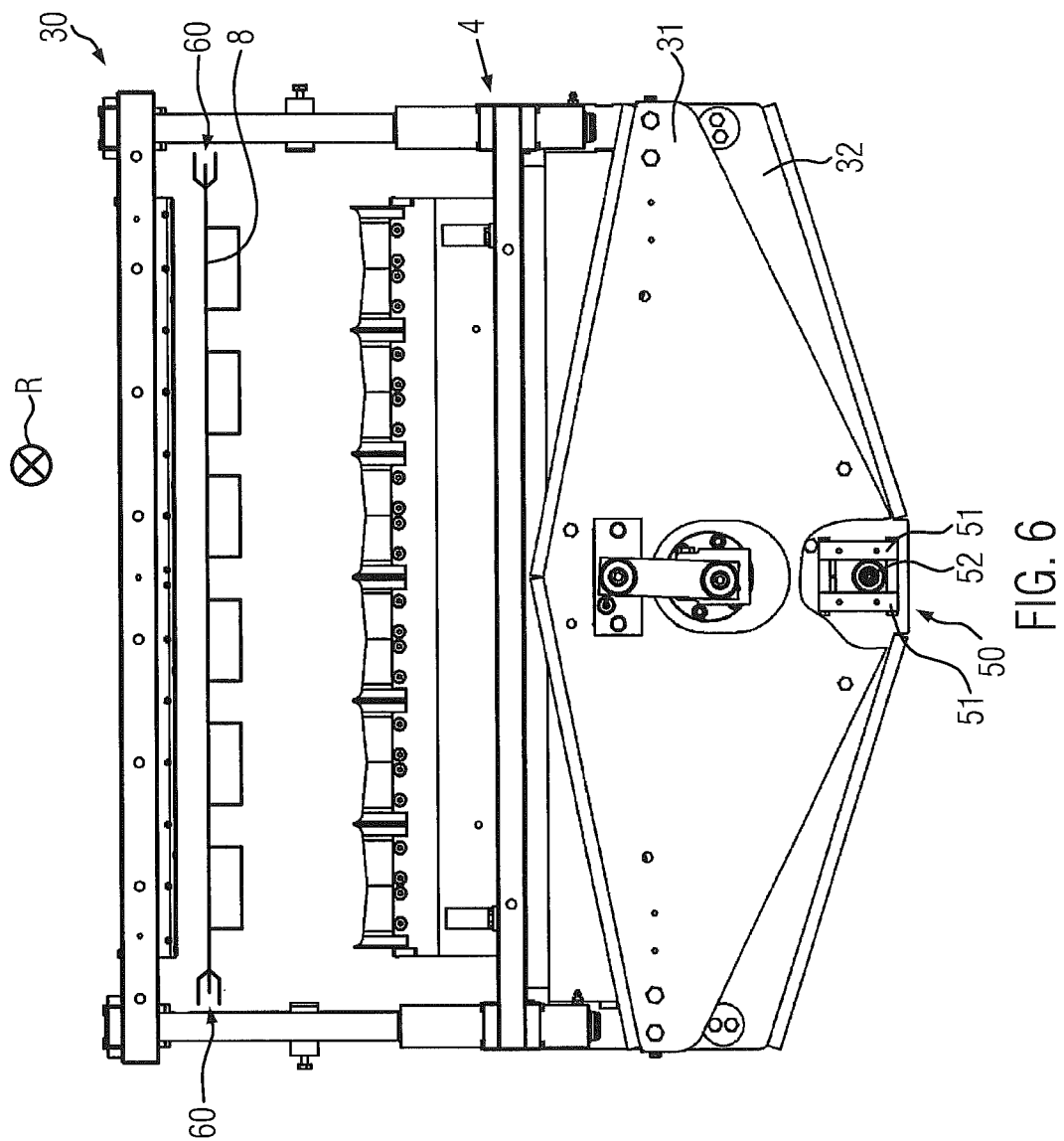
FIG. 6 is a side view of the lifting device of FIG. 5 in the production direction.

FIG. 6 shows the lifting device 30 in an opened position in a view in the production direction R. In addition to the guide 47 of the frame 32, the latter is guided via a guiding facility 50 with respect to the stand 31. The guiding facility 50 shows two rails 51 disposed in parallel with respect to each other and at the frame 32 between which a pin 52 is guided, the pin being connected with the stand 31. A bushing of a gliding material or a ball bearing may also be attached on the pin 52. The film web 8 can be held by two clamp chains 60 disposed on either side which are represented only schematically and may be transported intermittently in the production direction R.

Figure 7:
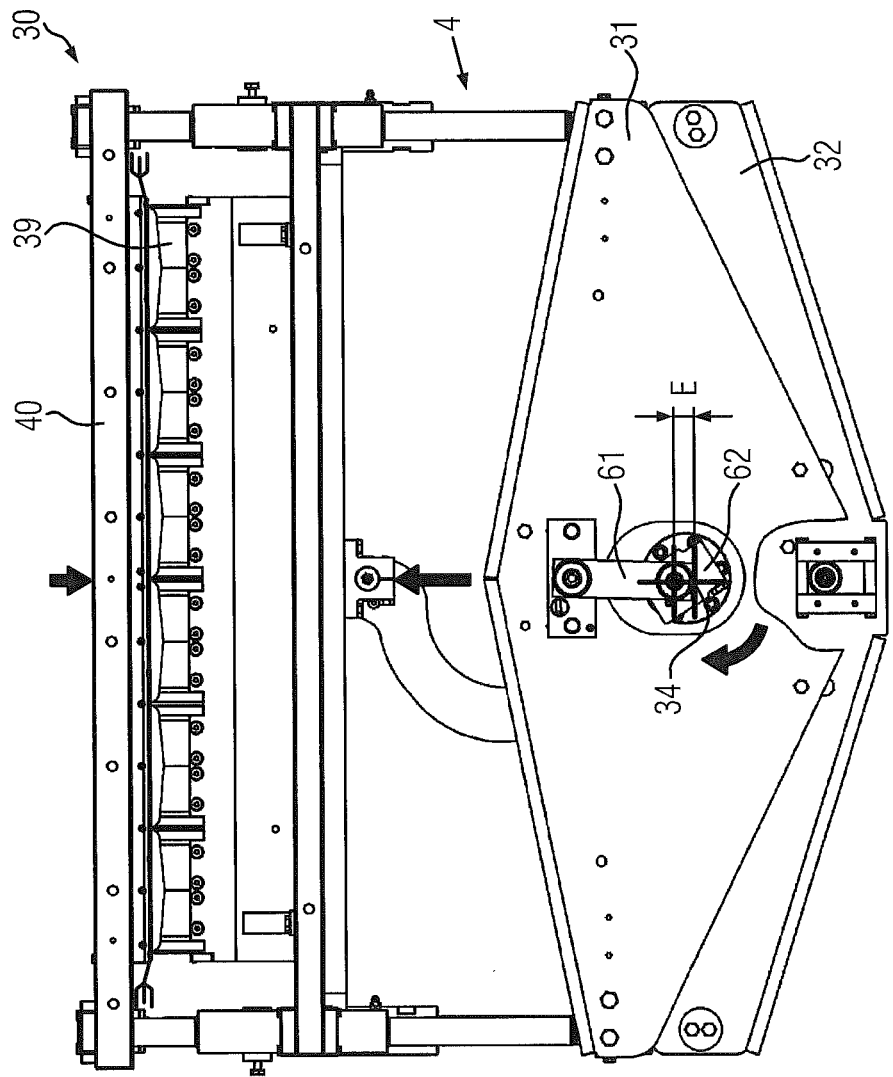
FIG. 7 is a side view of the lifting device of FIG. 5 at the beginning of a cutting operation.

FIG. 7 shows the lifting device 30 in the position in which the counter knife 40 from above and the cutting knife 39 have approached the film web 8 such that the counter knife 40 is resting against the film web 8 and the cutting knife 39 starts to penetrate the film web 8 and begins with the cutting operation. The latter may be adapted with respect to the cutting knife 39 by adjustments of the rotary element 35, which is hidden in this view, on the axis 34 of the motor 33, which is hidden in this view, and with respect to the frame 32 and thus the counter knife 40 via the position and eccentricity E of an eccentric 62 as rotary element with respect to the axis 34. Via a lever 61 and the eccentric 62, the rotation of the axis 34 of the motor 33 may be converted into a relative motion of the frame 32 with respect to the stand 31. The greater the eccentricity E, which is a radial distance of the axis 34 of the motor 33 to the receiving axis of the lever 61 at the eccentric 62, is selected, the larger is the lifting motion (see the upper arrow and the lower short arrow) the counter knife 40 performs.

Figure 8:
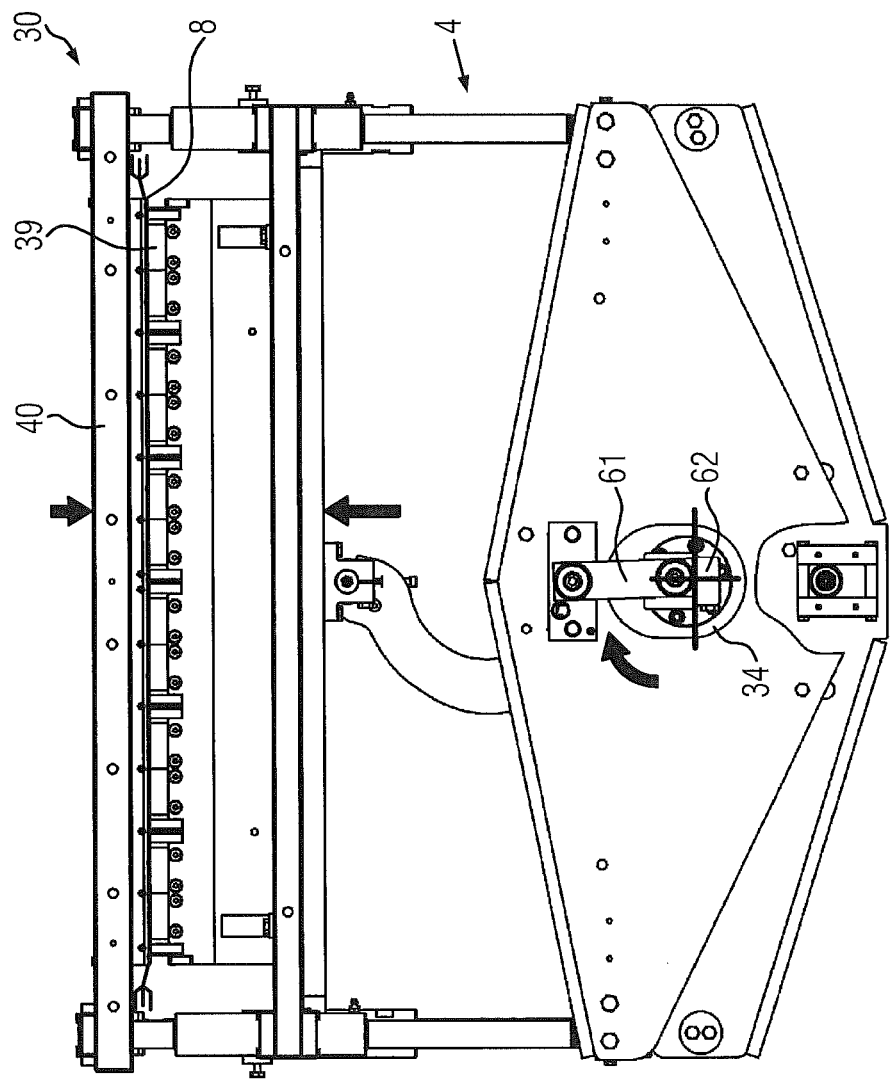
FIG. 8 is a side view of the lifting device of FIG. 5 in a closed position.

FIG. 8 shows the lifting device in its closed position at the end of the cutting operation where the cutting knife 39 has cut the film web 8 corresponding to the cutting line and has dived into the counter knife 40 in this process. In this configuration, the counter knife 40 has somewhat moved the film web 8 with respect to the position of FIG. 7 to the bottom (see upper arrow) while exerting some pressure on the film web 8. This lifting motion may be minimized by changing the position of the eccentric 62 on the axis 34 such that towards the end of the lifting motion of the cutting knife 39, the counter knife 40 already performs a small downward movement against the film web 8 and back again to the top to then lie against the film web 8 without pressure at the end of the movement. Thus, the lifting motion that leads to a deflection of the film web 8 may be approximately halved, and the film web 8 is only minimally deflected. When this lifting device 30 is used as a lifting gear in a forming station 2 or in a sealing station 3, such deflection is uncritical.

Figure 9:
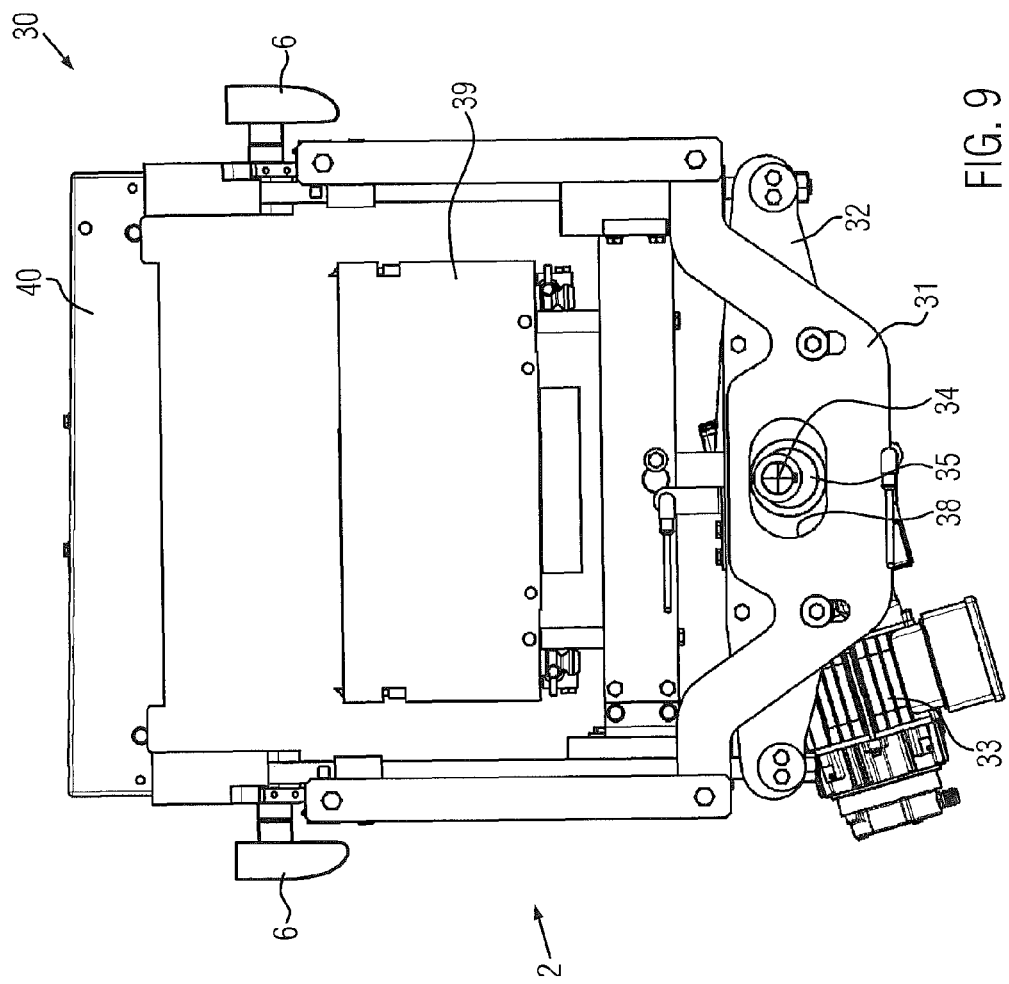
FIG. 9 is a side view in the production direction of a lifting device in accordance with a third embodiment of the present invention, the lifting device being used in connection with a forming station and being shown in an opened position.
Figure 10:
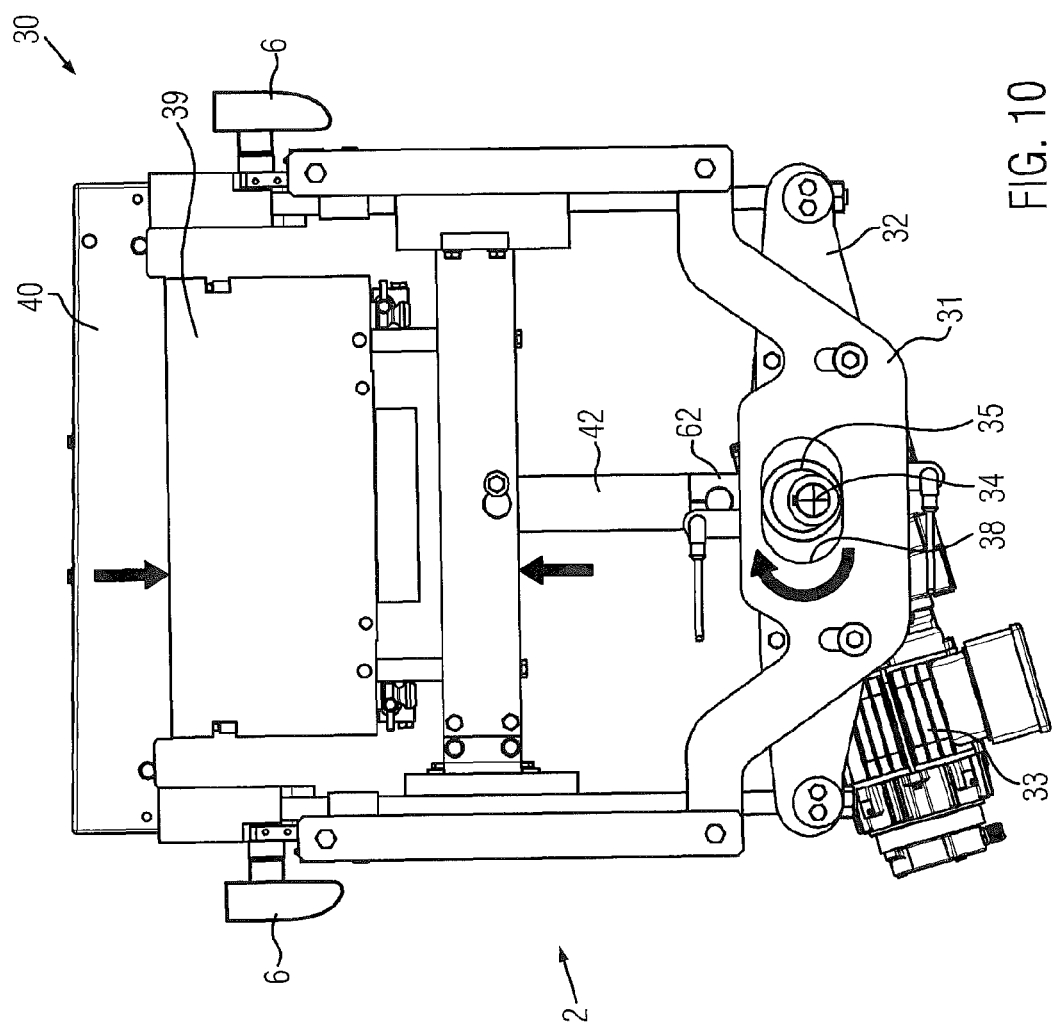
FIG. 10 is a side view of the lifting device of FIG. 9 in a closed position.

FIG. 9 shows a second variant of a lifting device 30, here in the embodiment of a forming station 2. The lower tool part 39 is designed as a lower mould part, and the upper tool part 40 is designed as an upper mould part. Like the lifting devices 30 of FIGS. 2 to 8, this lifting device 30 is also mounted to the machine frame 6. As in the previous variants, the motor 31 can be mounted to the frame 32, and a rotary element 35 in the form of an eccentric plate may be disposed on the axis 34, the rotary element 35 being mounted in a guide 38. A rotation of the rotary element 35 causes a relative motion of the frame 32 with respect to the stand 31. The rotary motion of the axis 34 can cause a lifting motion of the lower tool part 39 via a lever 62 and a push rod 42 (see FIG. 10), which act as toggle.

Starting from the embodiments represented here, the deep-drawing packaging machine according to the invention may be modified in many respects. It would be possible, for example, to attach the motor 33 not to the frame 32, but to the stand 31.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating a cutting station of a deep-drawing packaging machine, said method comprising the steps of:
   providing a lifting device for a cutting station, said lifting device including a stand which is mounted to a machine frame of the deep-drawing packaging machine, a lower cutting tool part which is connected with a motor by a push rod, and a second frame which is driven by the motor for a movement perpendicular to a film web and relative to said stand,
   moving the lower cutting tool part upwards to the film web using the motor;
   moving an upper cutting tool part and the second frame downwardly toward the film web using the motor, wherein the upper cutting tool part is linked to the second frame, and wherein at least some of the downward movement of the upper cutting tool part occurs simultaneously with the upward movement of the lower cutting tool part.

2. The method according to claim 1, further comprising moving the lower tool part upwards to the film web using the motor, while the upper tool part is stationary with respect to the film web.

3. The method according to claim 2, further comprising resting the upper tool part against the film web in a stationary position while the lower tool part is moving upwardly toward the film web.

4. A method of operating a cutting station of a deep-drawing packaging machine, said method comprising the steps of:
   moving a lower cutting tool part upwardly in a direction substantially perpendicular to a film web between a lowered position and a raised position using a motor, wherein the lower tool part is operably connected to the motor;
   moving an upper cutting tool part downwardly in a direction substantially perpendicular to the film web between a raised position and a lowered position using the motor, wherein the upper cutting tool part is operably connected to the motor by a mechanical linkage; and
   wherein at least a portion of the downward movement of the upper cutting tool part occurs simultaneously with the upward movement of the lower tool part.

5. The method of claim 4 wherein said moving the lower cutting tool part step further comprises rotating the motor to radially displace a lever to effectuate the upward movement of the lower cutting tool, wherein the lower cutting tool part is operably connected to said lever by a push rod; and wherein the moving the upper cutting tool part step further comprises rotating the motor to effectuate the vertical displacement of a second frame relative to a stationary stand of the cutting station, wherein said mechanical linkage includes the second frame connected to said upper cutting tool and said second frame being operably connected to said motor by a mechanical device.

* * * * *

UNITED STATES PATENT AND TRADEMARK OFFICE
CERTIFICATE OF CORRECTION

| | | |
|---|---|---|
| PATENT NO. | : 9,573,337 B2 | Page 1 of 1 |
| APPLICATION NO. | : 14/183695 | |
| DATED | : February 21, 2017 | |
| INVENTOR(S) | : Andreas Streitenberger, Elmar Ehrmann and Robert Maier | |

It is certified that error appears in the above-identified patent and that said Letters Patent is hereby corrected as shown below:

On the Title Page

Item (73) should read:
(73) Assignee: MULTIVAC SEPP HAGGENMUELLER SE & CO. KG, Wolfertschwenden (DE)

Signed and Sealed this
Twenty-third Day of January, 2018

Joseph Matal
*Performing the Functions and Duties of the
Under Secretary of Commerce for Intellectual Property and
Director of the United States Patent and Trademark Office*